United States Patent [19]

Nikaido et al.

[11] Patent Number: 4,564,926
[45] Date of Patent: Jan. 14, 1986

[54] INFORMATION MEMORY DEVICE WITH ADDRESS MULTIPLEXING

[75] Inventors: Tadanobu Nikaido; Norio Miyahara; Kanji Tawara, all of Tokyo, Japan

[73] Assignee: Nippon Telegraph & Telephone Public Corporation, Japan

[21] Appl. No.: 385,163

[22] Filed: Jun. 4, 1982

[30] Foreign Application Priority Data

Jun. 9, 1981 [JP] Japan .................. 56-88375

[51] Int. Cl.⁴ .................... G11C 8/00; G11C 7/00
[52] U.S. Cl. .................. 365/230; 365/233; 365/189
[58] Field of Search ............. 365/230, 233, 222, 189

[56] References Cited

U.S. PATENT DOCUMENTS

| | | | |
|---|---|---|---|
| 3,798,617 | 3/1974 | Varadi et al. | 365/230 |
| 4,099,256 | 7/1978 | Draper | 365/230 |
| 4,207,618 | 6/1980 | White, Jr. et al. | 365/222 |
| 4,347,589 | 8/1982 | Proebsting | 365/222 |
| 4,376,988 | 3/1983 | Ludwig et al. | 365/189 |

FOREIGN PATENT DOCUMENTS 0212677 12/1982 Japan .................. 365/230

OTHER PUBLICATIONS

Tawara et al., "A Time Division Switching Network Based on Time Switches", Review of the Electrical Communication Labs., vol. 27, Nos. 9-10, Sep.-Oct. 1979, pp. 758-772.

Primary Examiner—Stuart N. Hecker
Assistant Examiner—Glenn A. Gossage
Attorney, Agent, or Firm—Remy J. VanOphem

[57] ABSTRACT

In an information memory device of the type wherein informations are sequentially stored in cells of a memory cell array and read out from the cells according to selected addresses, there are provided an internal address generator for generating an internal address, an address information selector for selecting either one of the internal address and an external address supplied from outside to form a selected address, and an information memory circuit for storing a memory information at a position designated by the selected address and for reading out the information stored in the designated position.

4 Claims, 22 Drawing Figures

INFORMATION MEMORY DEVICE WITH ADDRESS MULTIPLEXING

BACKGROUND OF THE INVENTION

This invention relates to an information memory device and more particularly an information memory device of the type wherein external memory informations are sequentially and randomly stored in locations designated by addresses and the stored information is randomly and sequentially read out from the locations designated by addresses.

According to a prior art information memory device of this type, memory informations supplied from outside are sequentially stored in locations of a memory cell array designated by external addresses, or memory informations stored in memory cells at locations designated external addresses are read out. An example of such a memory device may be a speech line switch of a digital telephone exchange, that is a time switch in which a speech path memory device having a plurality of memory cells is used to assign, in a predetermined sequence, time divisioned data on an incoming highway to time slots on an outgoing highway.

In the information memory device of this construction, it is usual to independently supply an address adapted to write an information and an address adapted to read out a stored information from an external source of addresses. For example, in the time switch described above, the data of respective time slots supplied from the incoming highway are randomly stored at predetermined locations in a speech path memory device according to addresses of a switch control memory device installed externally, and where the stored information is read out for time slots of the outgoing highway from the speech path memory device. The stored information is sequentially read out from predetermined positions of the speech path memory device in accordance with an address which are the count number of an external counter. Usually, the output from the switch control memory device and the counter output are selectively transferred by using two switches so as to alternately perform the write operation and the read operation described above. One example of such construction is disclosed in K. Tawara et al paper entitled "A time division switching network based on time switches", Review of the Electrical Communication Laboratories, Vol. 27, Nos. 9-10, September-October, 1979, Pages 758-772. Accordingly, it is usual to supply the external address to the memory device at an operation period having a predetermined constant time margin.

However, when one tries to shorten the operation period of the device, that is the memory access time, it is impossible to neglect the time margin. For this reason, it is essential to reduce the memory access time caused by the time margin in order to perform a high speed operation.

For example, for effecting telephone exchange between highways each having 1024 channels at a speed of 8M bits/sec. with the time switch, the prior art time switch described above requires an access time of 30 nanoseconds. With such high speed access time, it is impossible to increase the density of the integrated circuits making it difficult to construct such time switch as an LSI.

SUMMARY OF THE INVENTION

Accordingly, it is an object of this invention to provide an improved information memory device than can operate at a high speed and is not required to provide a margin to the cycle time of the memory device.

Another object of this invention is to provide an information memory device than can readily be fabricated into an LSI.

According to this invention, there is provided an information memory device of the type wherein informations are sequentially stored in cells of a memory cell array and read out from the cells according to addresses, characterized in that there are provided an internal address generator for generating an internal address, an address selector for selecting either one of the internal address or an external address supplied from outside to form a memory address, and an information memory circuit for storing a memory information at a location designated by the address and for reading out the information stored in the designated.

BRIEF DESCRIPTION OF THE DRAWINGS

In the accompanying drawings:

FIGS. 5 is a block diagram showing the construction of modified embodiment of the information memory device according to this invention and FIGS. 6A through 6C show waveforms for explaining the operation of the LSI chip shown in FIG. 4 in relation to FIGS. 3A-3J.

DETAILED DESCRIPTION OF THE PREFERRED EMBODIMENTS

Figure 1:
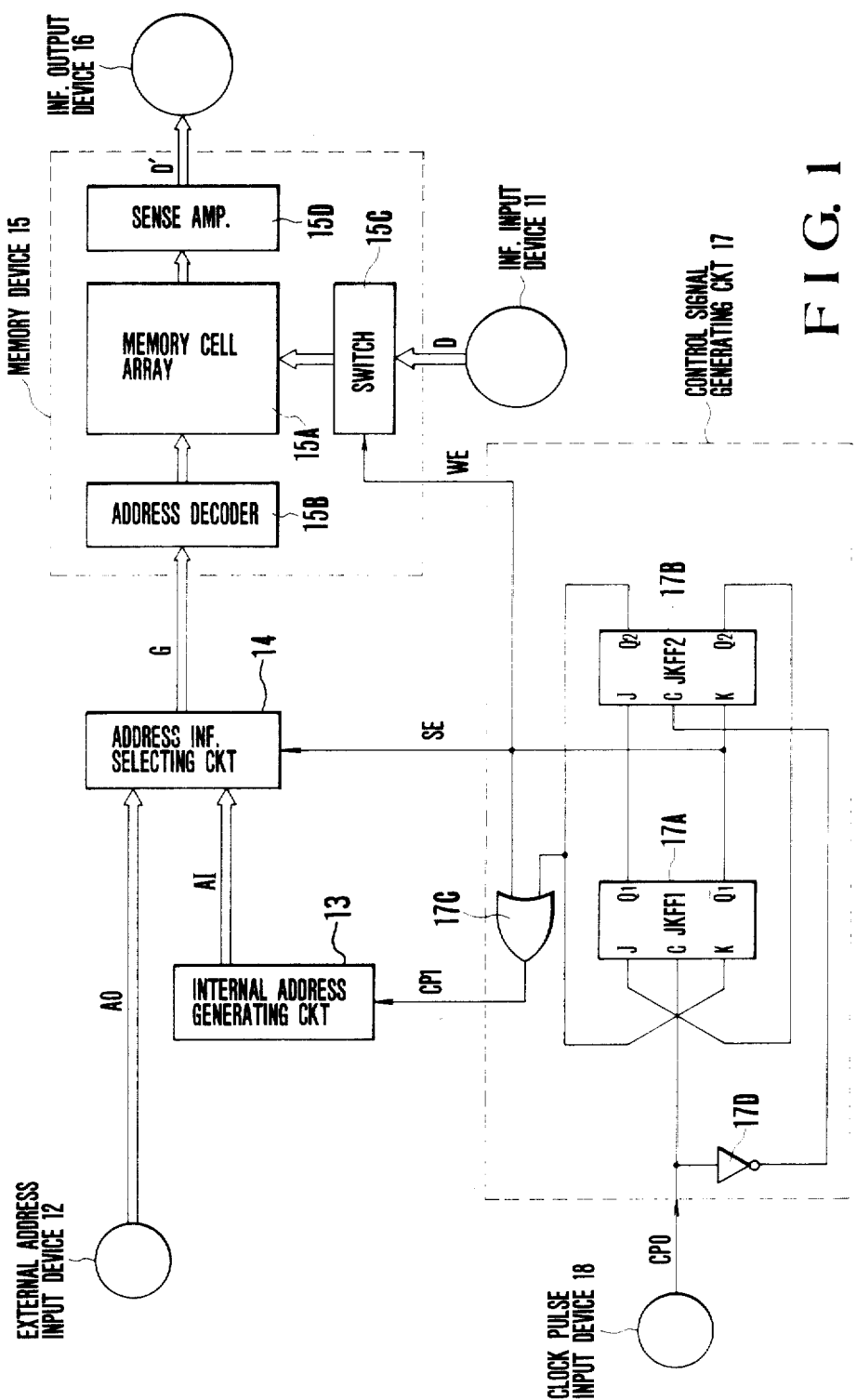
FIG. 1 is a block diagram showing the basic construction of one embodiment of the information memory device according to this invention.

FIG. 1 shows one embodiment of the information memory device of this invention, and applied to a time switch of a time division telephone exchange. The information memory device consists of a memory information input device 11 for receiving from an external source the informations D to be stored. The informations D are assigned with time slots constituting one frame at 125 microseconds, for example, corresponding to a plurality of subscriber lines. The memory information input device 11 may be a data input terminal or the incoming highway of a time switch. The information memory device also includes an external address input device 12 receiving an external address AO representing whether the external memory information should be stored in cells of a memory cell array, for example in cells on each word line constituting the memory cell array, as described later. The external address input device 12 corresponds to a switch control memory device under the control of a central processing unit, not shown, and is utilized to read out informations from the memory array to be described later and to suitably assign the read out informations to an outgoing highway, for example to a plurality of time slots of one frame having a length of 125 microseconds. Since such a switch control memory device is well known, it will not be described herein. The external address input device 12 may be an address input terminal. The information memory device contains an internal address generator 13 which produces an internal address AI consisting of a general purpose counter which sequentially counts the number of clock pulses CP1 to output in parallel its count member as the internal address AI.

The information memory device includes an address information selector 14 supplied with the external address AO from the external address input device 12 and the internal address AI from the internal address generator 13. The circuit details and operation of the internal address generator 13 and the address information selector 14 are well known in the art and need not be explained in detail for an understanding of the invention. The address information selector 14 outputs either the external address AO or the internal address AI as a selected address G in accordance with an address information selection pulse SE supplied from a control signal generator, to be described later. In this example, in a write mode, in which an information is stored in the memory device, the internal address AI is used as the selected address G while in a read out mode the external address AO is used as the selected address.

A memory device 15 functions as a speech path memory device, of the time switch of a time division speech path. As is well known in the art, the memory device 15 consists of a memory cell array 15A containing a plurality of memory cells arranged in a matrix, an address decoder 15B which designates addresses of the memory cell array 15A in accordance with the selected address G, a switch 15C which stores the memory information from information input device 11 in a predetermined memory cell of the memory cell array 15A in accordance with the output of the address decoder 15B when a write/read pulse WE is in the write mode, and a sense amplifier 15D which reads the stored information out of the memory cell array 15A as an information D' in accordance with the output from the address decoder 15B when the write/read pulse WE is in the read out mode. The stored information output from the sense amplifier 15D is assigned to one of a plurality of time slots constituting one frame of 125 microseconds and then supplied to an information output device 16 which may be a data output terminal or the outgoing highway itself of a time switch.

Figure 2:
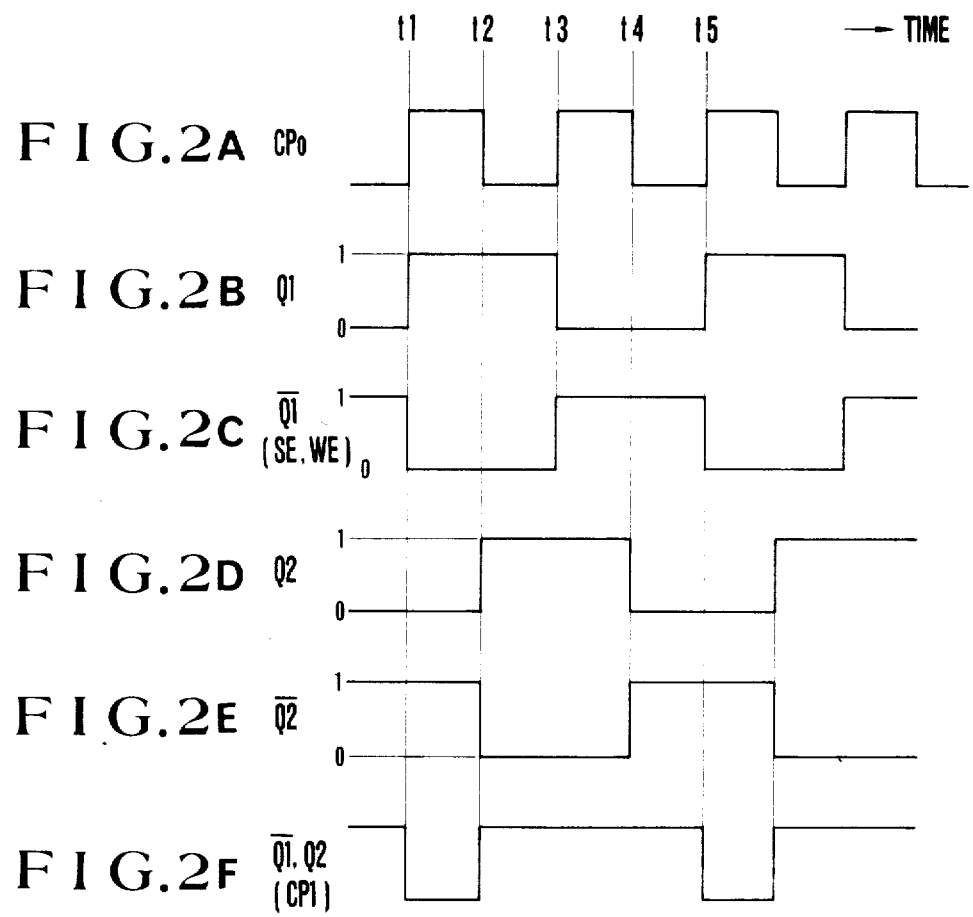
FIGS. 2A through 2F show waveforms useful to explain the operation of the control signal generator shown in FIG. 1.

The information memory device is further provided with a control signal generator 17 which generates the clock pulse ÇP1, the address information selection pulse SE and the write/read pulse WE. The control signal generator 17 is construted of two J-K type flip-flop circuits 17A and 17B, an OR gate circuit 17C and an inverter 17D. When a clock pulse CP0, as shown in FIG. 2A, having a period of 60 nanoseconds is supplied to the control signal generator 17 from a clock pulse input device 18, the circuit elements of the control signal generator 17 operate as described below to produce signals CP1, SE and WE described above.

More particularly, the clock pulse CP0 is applied to terminal C of the J-K flip-flop circuit 17A identified as J-K FF1. Then, the output state thereof is changed as shown in FIGS. 2B and 2C at time t1 whereby the Q output becomes "1" and the $\overline{Q}$ output becomes "0", these Q and $\overline{Q}$ outputs being applied to J and K terminals respectively of the J-K flip-flop circuit 17B, identified as J-K FF2. At a time displaced from time t1 by one half period of the cycle of the clock pulse CP0, that is at time t2 when the clock pulse CP0 changes its state (builds down), the signal representing the change is supplied to terminal C of the J-K FF2 via the inverter 17D. Accordingly, the J-K FF2 changes its state as shown in FIGS. 2D and 2E according to Q1 and $\overline{Q1}$ output of J-K FF1 suppled to its J and K terminals, with the result that the Q2 output of J-K FF2 becomes "1" and $\overline{Q2}$ output becomes "0". These outputs Q2 and $\overline{Q2}$ are respectively supplied to terminals K and J of J-K FF1. At time t3, when the clock pulse CP0 builds up, the J-K FF1 changes its state so that Q1 and $\overline{Q1}$ outputs thereof becomes "0" and "1" respectively.

At this time t3, however, since a positive input is applied to terminal C of J-K FF1, the J-K FF2 does not change its state. At a time when the clock pulse CP0 builds down again a signal "1" is input to terminal C of J-K FF2 so that this flip-flop circuit changes its state with the result that its Q2 and $\overline{Q2}$ output become "0" and "1" respectively. At this time, however, the J-K FF1 does not change its state. Thereafter, each time the clock pulse CP0 is supplied, the operation described above is repeated. In relation to the operation described above, the OR gate circuit 17C changes its state between times t1 and t2 so as to apply a waveform shown in FIG. 2F to the internal address generator 13 as an address generator clock pulse CP1. The $\overline{Q1}$ output of the J-K FF1 is supplied to the address information selector 14 and to the switch 15C of the memory device 15 to act as an address information selection pulse SE and a write/read pulse WE respectively.

The operation of the circuit shown in FIG. 1 will be described with reference to FIGS. 3A through 3J. It will be noted that FIG. 3A corresponds to FIG. 2A, FIG. 3B to FIG. 2F, FIGS. 3D and 3E to FIG. 2C respectively.

Figure 3:
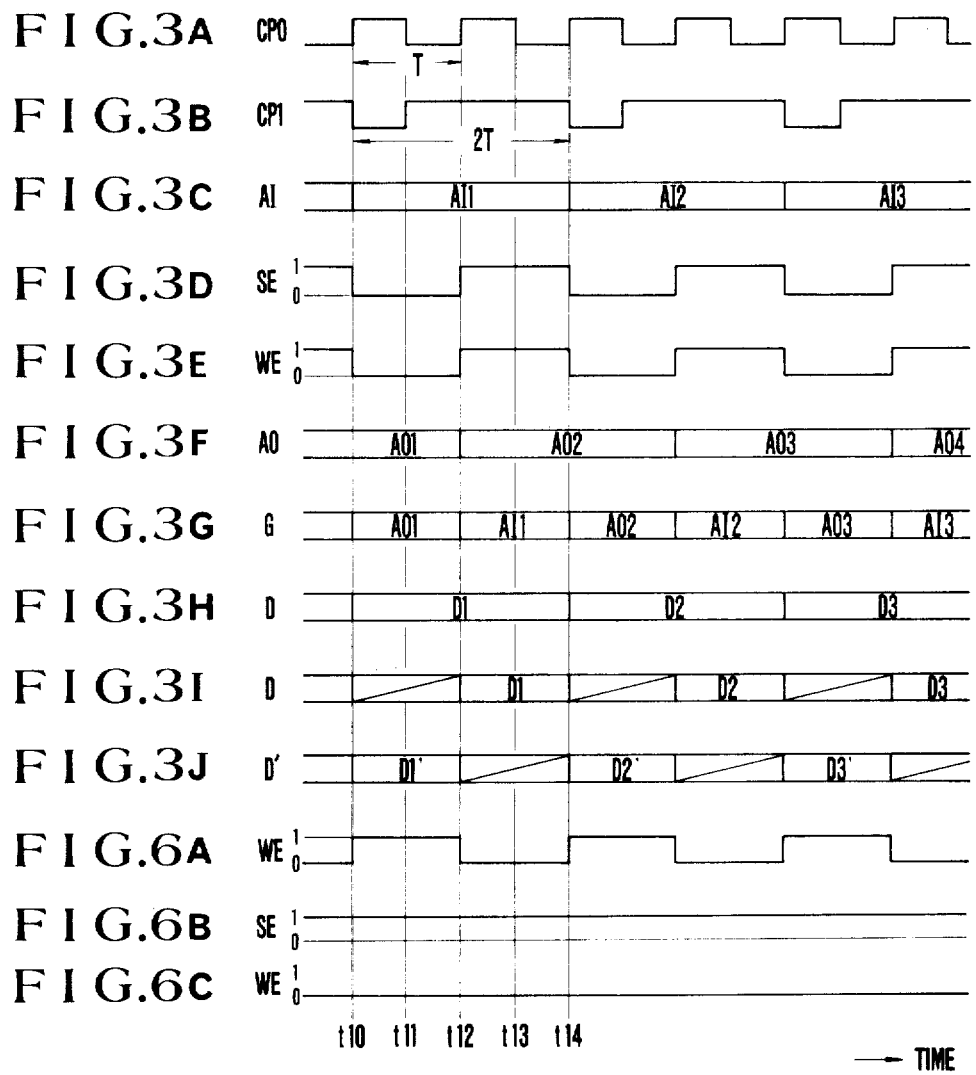
FIGS. 3A through 3J show waveform useful to explain the operation of the device shown in FIG. 1.

When a clock pulse CP0 shown in FIG. 3A is received from the clock pulse input device 18, the control signal generator 17 generates pulses respectively shown by FIGS. 3B, 3D and 3E, which are supplied to the internal address information generator 13, address selecting circuit 14 and the switch 15C of the memory device 15 respectively. In this case the clock pulse CP0 is a pulse having a duty ratio of 50% and a period of T. The clock pulse CP1 is synchronous with the clock pulse CP0, has a period of 2T, and a duty ratio of 75%. The clock pulse CP1 becomes a "0" level only during alternate positive half cycles of the clock pulse CP0.

As above described, the internal address generator 13 contains a counter which when supplied with the clock pulse CP1 sequentially counts the number of it so as to supply, as the internal address AI, binary coded signals AI1, AI2 and AI3 . . . corresponding to decimal values 1, 2, 3 . . . at each period 2T.

When supplied with the address information selection pulse SE shown in FIG. 3D and having a period of 2T and a duty cycle of 50% from the control signal generator 17, the address information selector 14 selects the external address AO as the selected address G during an interval T (t10–t12) in which the address information selection pulse SE is at the "0" level, whereas selects the internal address AI as the selected address during a succeeding interval T (t12–t14). Consequently, the selected address G consists of alternate combinations of the external address AO1, AO2 . . . and the internal address AI1, AI2 . . . at each period T. The selected address G is supplied to the address decoder 15B in the memory device to be decoded for producing a word designation signal of the memory cell array 15A.

To the switch 15C of the memory device 15 is supplied a write/read pulse WE shown in FIG. 3E from the control signal generator 17. The write/read pulse WE is the same as the address information selection pulse SE and brings the memory device 15 in the read out mode during an interval t10-t12 in which the level of the pulse WE is "0", and further brings the memory device 15 in the write mode during an interval t12-t14 in which the pulse level is "1". Consequently, the switch 15C sequentially takes in or stores, at a timing shown in FIG. 3I, memory informations D1, D2, D3 . . . acting as the memory information D shown in FIG. 3H from the memory information input device 11 during an interval of T of t12-t14. The memory informations thus taken into the switch 15C are sequentially stored in the designated memory cells of the memory cell array 15A in accordance with the internal addresses AI1, AI2, AI3 . . . supplied from the address decoder 15B.

During an interval in which the write/read pulse WE is at the "0" level (for example during an interval t10-t12 shown in FIG. 3E) the switch 15C does not take in the memory information from the memory information input device 11. Consequently, during this interval, address designation signals corresponding to the external addresses A01, A02 . . . , that is, the word designation signals from the address decoder 15B, are sequentially supplied to the memory cell array 15A so that the stored informations D1', D2', D3', that is, the contents of the designated memory cells are sequentially sent to the information output device 16 or the output terminal via the sense amplifier 15D at a timing shown in FIG. 3J.

As above described, according to this invention, since the address designation of a memory device is made by using not only an external address supplied from outside but also an internal address generated by an internal address generator contained in the memory device, the period in which the external address is input becomes twice that of the operating period of the memory device thereby absorbing the time margin. Consequently, the memory device can operate at an operation period determined by the performance of the memory device itself without being affected by the time margin inherent to the memory device.

Furthermore, according to this invention instead of alternately generating an external address for reading and an internal address for writing by a transfer switch, since a portion of an interval not containing any deviation of the external address and a portion of the internal address not overlapping the first mentioned portion are selected by a selector, it is possible to double the operating speed with conventional construction. This is an important feature of this invention. Thus, when the memory device of this invention is fabricated as an LSI, it is possible to double the speed of a prior art memory device having the same dimension. Moreover, even when the speed is increased, since it is not necessary to use any special high speed switching element, it is possible to use a low power device and to increase the density of the integrated circuit. More particularly, where the invention is applied to a time switch for use in a time division telephone exchange it is possible to increase the degree of integration to 16 k bits where n MOS devices are utilized. Accordingly, a memory device and a counter corresponding to 1024 channels can be installed in the LSI. Thus, when compared with a prior art time switch having a multiplexed 1024 channels it is possible to reduce the number of the integrated circuits to 1/40 and the power consumption to 1/9. The ratio of the area of the memory array, the area of the peripheral pad and the address control circuit acting as an interface between the memory device and the logic circuit elements, and the area of logic circuit elements as the switch and the sense amplifier associated with the memory array of the information memory device embodying the invention is 6:3:1, and the area occupied by the control signal generator is only 2% of the total area. It should be noted, that this corresponds to the area of the conventional memory LSI so that it is not always necessary to substantially increase the area of the memory array.

Figure 4:
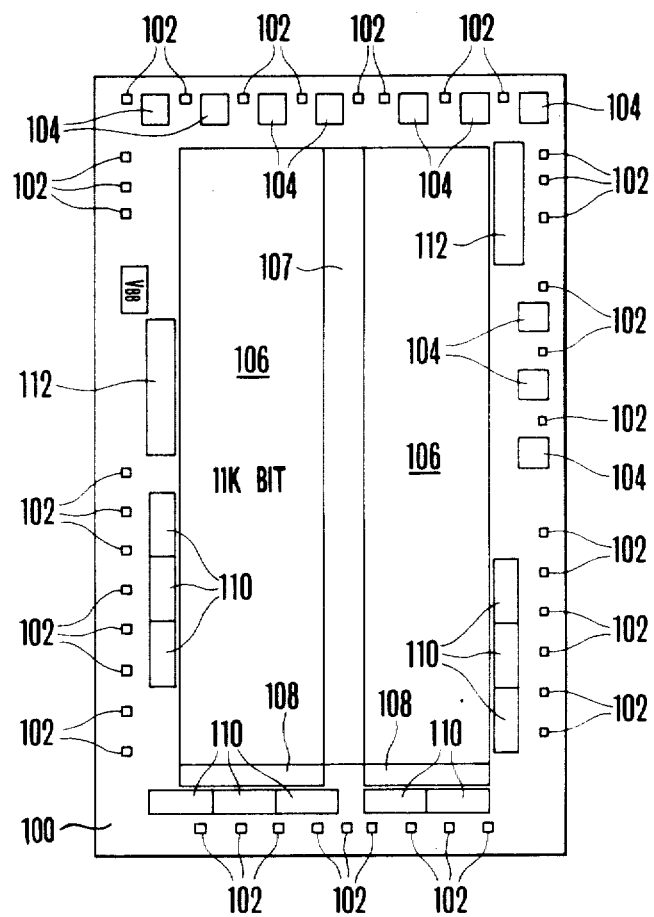
FIG. 4 shows one example of the layout of time switches on an LSI chip embodying the invention.

FIG. 4 diagrammatically shows the layout of LSI chips and the percentage of the area occupied thereby of a time switch embodying the invention. Each chip 100 has a size of 3.9 mm×6.35 mm. FIG. 4 also shows bonding electrodes 102, address control circuits 104, each consisting of an internal address generator 13 and an address information selector 14, a memory array 106 having a capacity of 11 k bits (128×48+128×40), a row decoder 107 and column decoders 108 which correspond to the address decoder 15B shown in FIG. 1. There is also provided a data input/output circuit 110 including a switch 15C, a sense amplifier 15D (see FIG. 1) and an interface buffer between the chip and the external circuit, a circuit unit 112 containing a circuit that forms the clock pulse CP0 in accordance with the external clock pulse, and a control signal generator 17 which forms signals CP1, SE and WE based on the clock pulse CP0.

Figure 5:
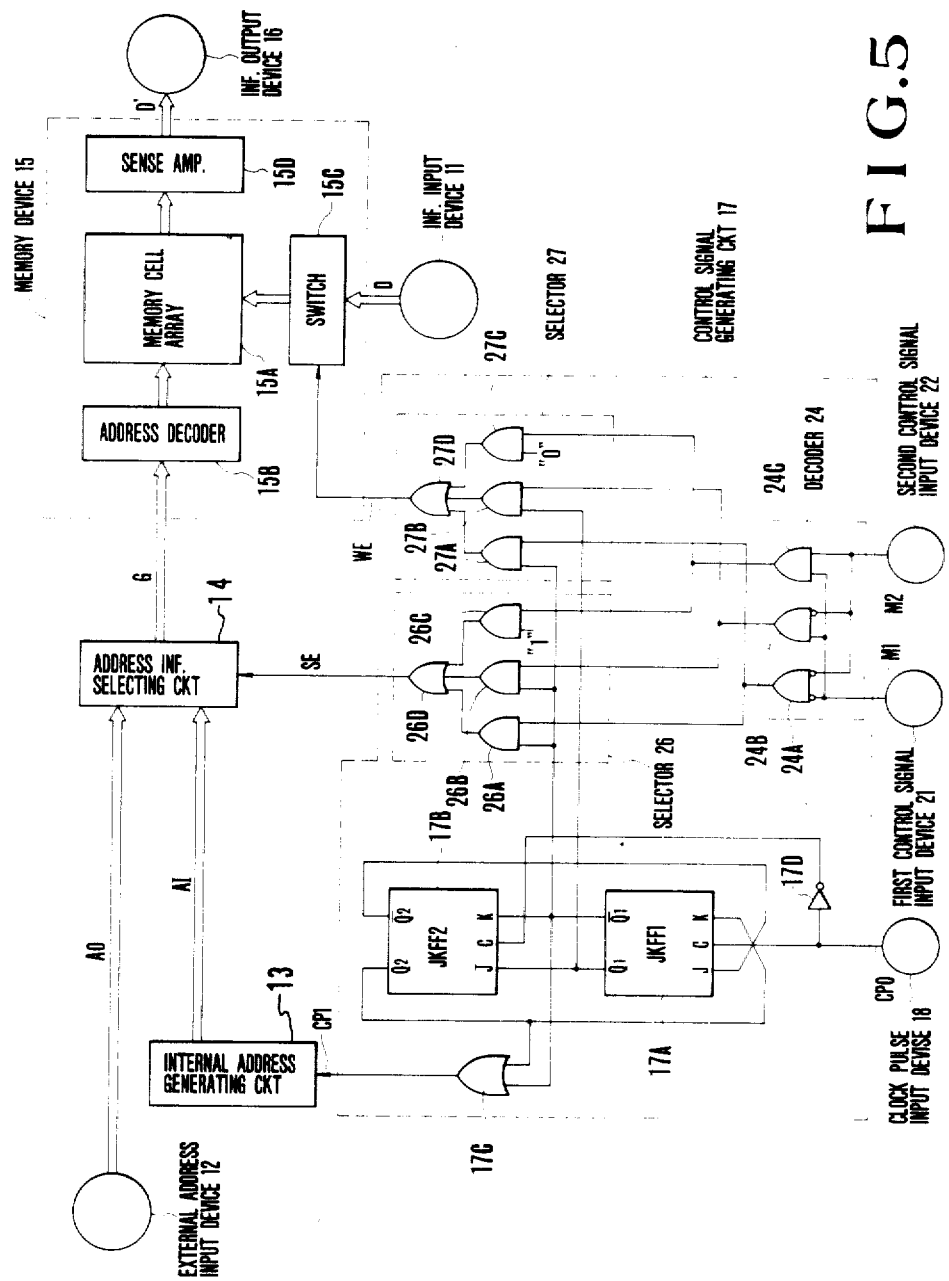

FIG. 5 shows another embodiment of the information memory device of this invention in which identical or similar elements to those shown in FIG. 1 are designated by the same reference characters. The control signal generator 17 shown in FIG. 5 is supplied with first and second signals M1 and M2 from first and second control signal input devices 21 and 22 in addition to the clock pulse CP0 from the clock pulse input device 18. The control signal generator 17 transfers the operation modes of the memory device 15 in accordance with a combination of the values of the first and second control signals M1 and M2.

For example, where the first control signal M1 is "0" and the second control signal M2 is "0", that is, in a secondary switch mode, a gate circuit 24A of a decoder 24 outputs "1" while the gate circuits 24B and 24C output "0" respectively. Consequently, AND gate circuits 26A and 27A of selectors 26 and 27 are enabled so that the $\overline{Q1}$ output of the J-K FF1 is output through OR gate circuits 26D and 27D as an address information selection pulse SE and a write/read pulse WE, respectively. This operation is the same as that of the embodiment shown in FIG. 1.

Where the first control signal M1 is "1" and the second control signal M2 is "0", that is, in a primary switch mode, the output of the gate circuit 24B of the decoder 24 becomes "1" and the outputs of the gate circuits 24A and 24C become "0" respectively. Consequently, AND gate circuits 26B and 27B of the selectors 26 and 27 are enabled so as to send out the Q1 output as the address information selection pulse SE and the Q1 output as the write/read pulse WE respectively through OR gate circuits 26D and 27D. This operation corresponds to a case dephased 180° from the above described case in which first and second control signals M1 and M2 are both "0". The write/read pulse WE sent out at this time alternately becomes "1" and "0" according to the timings shown in FIG. 6A. The address information selection pulse SE is the same as that shown in FIG. 3D.

Such phase shift of the address designation enables to write with the external address A0 and to read with the internal address AI. A primary switch of a T-S-T construction can be used where the first control signal M1 is "1" and the second control signal is "1" (a mode in which the switch control memory device operates), the output of the gate circuit 24C of the decoder 24 becomes "1" and the outputs of the gate circuits 24A and 24B become "0" with the result that the AND gate circuits 26C and 27C of the selectors 26 and 27 are enabled. As a consequence, the AND gate circuit 26C sends a signal "1" (shown in FIG. 5B) to the address information selector 14 via the OR gate circuit 26D as the address information selection pulse SE. Accordingly, the address information selector 14 selects only the internal address AI and continuously outputs this address as the selected address G.

At this time, as shown in FIG. 5C, the AND gate circuit 27C sends a signal "0" to the switch 15C via the OR gate circuit 27D thereby closing the switch 15C. Consequently, the memory device 15 adopts a read out mode when the first control signal M1 is "1", and the second control signal M2 is "1" thus sequentially reading out the content of the memory cell array 15A according to the internal address AI and the read out information is sent to the information output device 16 via the sense amplifier 15D.

For the reason described above, with the construction shown in FIG. 5 it is possible to write and read out informations at high speed in various different modes depending upon the combination of the first and second control signals M1 and M2.

It should be understood that the invention is not limited to the specific embodiments described above and that various modifications may be made without departing from the true spirit and scope of the invention.

For example, the memory device of the foregoing embodiments may be modified to write and read a memory information having a larger number of bits than those of the external and internal address A0 and AI. Then it becomes possible to use the memory cell array as the memory circuit of an address information. Where the memory device is used also as a switch control memory device the bit number of the memory information is necessary. More particularly, in an ordinary switch control memory device reading is made with sequential adresses, but only when designated, writing is made of random addresses. Thus, reading is made with control signals of M1="1" and M2="0", and when designated it is made M1="1" and M2="0" so as to write with a random address (external address) at that time, and reading is continued with sequential addresses. Thus, writing into the switch control memory device itself is made by switching the control signal M2 only when designated.

In the foregoing embodiments, the clock pulse CPO, the address information selection pulse SE and the write/read pulse WE may be supplied from external sources by eliminating the control signal generator 17.

What is claimed is:

1. An integrated memory device for a time switch comprising:
   an external address input device for receiving external addresses from an external address source;
   an internal address generator for sequentially generating internal addresses in response to address clock pulses;
   an address selector for selecting one or the other of said internal and external addresses in response to a select signal to transmit the address selected as a selected address;
   memory circuit means having a plurality of bit locations for storing information received from an external information source at a bit location designated by said selected address in response to a write signal and for reading out the information stored at said bit location designated by said selected address in response to a read signal; and
   a control signal generator responsive to clock pulses having a predetermined period T received from an external clock, said control signal generator having first means for alternately generating said read and write signals, second means for generating said select signal in synchronization with a respective one of said read and write signals, and third means for generating said address clock pulses having a period two times said predetermined period T.

2. The integrated memory device of claim 1 wherein said control signal generator includes means responsive to a first external control signal for activating said first means to alternately generate said read and write signals and said second means to generate said select signal in synchronization with the generation of said write signal, and responsive to a said second external control signal for activating first means to alternately generate said read and write signals and second means to generate said select signal in synchronization with the generation of said read signal, and further responsive to a third external control signal for actuating said first means to repetitively generate said read signal and for actuating said second means to repetitively generate a select signal selecting said internal address.

3. The integrated memory device of claim 1 wherein said internal address generator comprises a counter which counts the number of received address clock pulses to generate a sequential internal addresses.

4. The integrated memory device of claim 1 wherein said control signal generator includes means responsive to a first external control signal for activating said first means to alternately generate said read and write signals and said second means to generate said select signal in synchronization with the generation of said write signal, responsive to a second external control signal for activating said first means to alternately generate said read and write signals and said second means to generate said select signal in synchronization with the generation of said read signal and further responsive to a third external control signal and said clock pulses having a predetermined period T for activating said first means to repetitively generate a respective one of said read and write signals and activating said second means to repetitively generate said select signal.

* * * * *

UNITED STATES PATENT AND TRADEMARK OFFICE
CERTIFICATE OF CORRECTION

PATENT NO. : 4,564,926

DATED : January 14, 1986

INVENTOR(S) : Nikaido et al

It is certified that error appears in the above-identified patent and that said Letters Patent is hereby corrected as shown below:

Column 1, line 41, delete "address" and insert ---- addresses ----.

Column 2, line 21, delete "designated" and insert ---- designated location ----.

Column 2, line 31, delete "waveform" and insert ---- waveforms ----.

Column 2, line 37, delete "invention" and insert ---- invention; ----.

Column 3, line 51, delete "construted" and insert ---- constructed ----.

UNITED STATES PATENT AND TRADEMARK OFFICE
CERTIFICATE OF CORRECTION

PATENT NO. : 4,564,926
DATED : January 14, 1986
INVENTOR(S) : Nikaido et al

It is certified that error appears in the above-identified patent and that said Letters Patent is hereby corrected as shown below:

Column 4, line 5, delete "suppled" and insert ---- supplied ----.

Column 4, line 17, delete "Q2", second occurrence, and insert ---- $\overline{Q2}$ ----: Same line, delete "become" and insert --outputs become --.

Column 4, line 39, delete "information". Same line, delete "se-".

Column 4, line 40, delete "lecting circuit" and insert ---- information selector ----.

Column 6, line 38, delete "second" and insert ---- second control ----.

Column 7, line 24, delete "adopts" and insert ---- adapts ----.

Signed and Sealed this

Eighth Day of July 1986

[SEAL]

Attest:

DONALD J. QUIGG

Attesting Officer

Commissioner of Patents and Trademarks